July 5, 1927.  1,634,565
A. F. WALLBILLICH
DRIVE FOR SPEED RESPONSIVE INSTRUMENTS
Filed Aug. 19, 1924  2 Sheets-Sheet 1
Fig. 1,
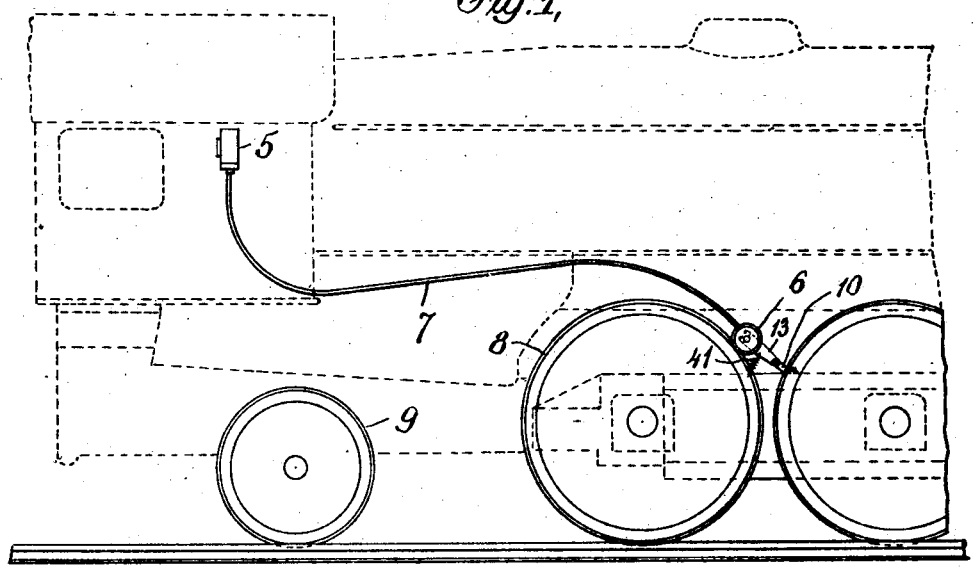
Fig. 2,
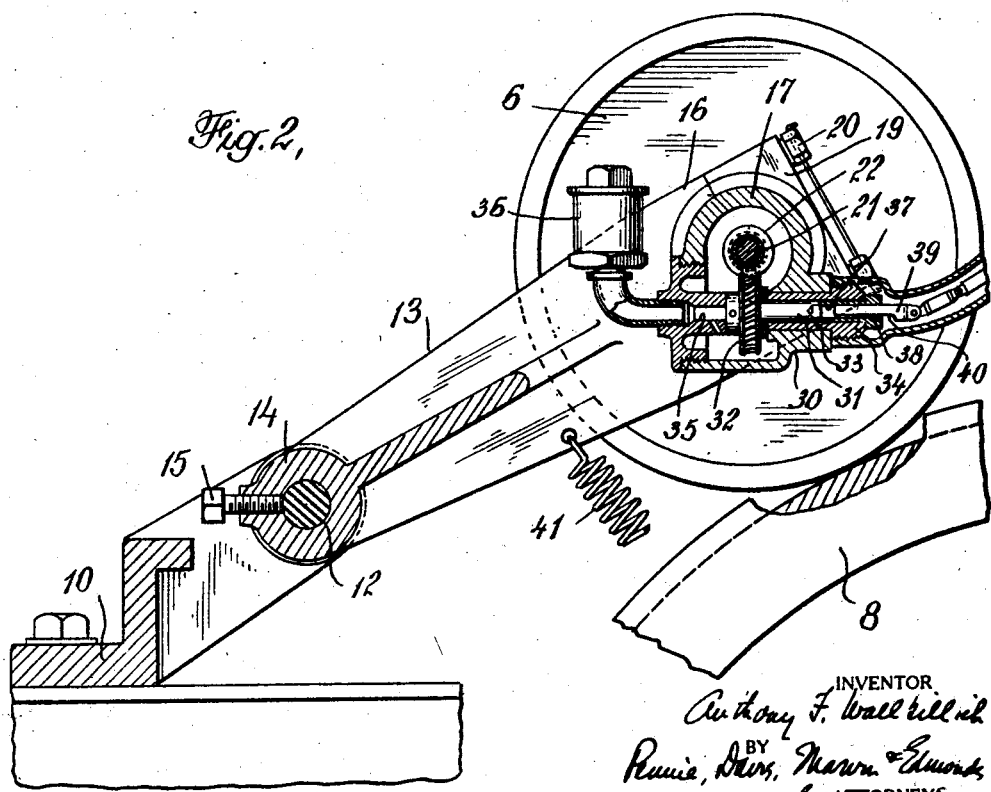
INVENTOR
Anthony F. Wallbillich
BY
*[signature]*
ATTORNEYS July 5, 1927.
A. F. WALLBILLICH
1,634,565
DRIVE FOR SPEED RESPONSIVE INSTRUMENTS
Filed Aug. 19, 1924
2 Sheets-Sheet 2
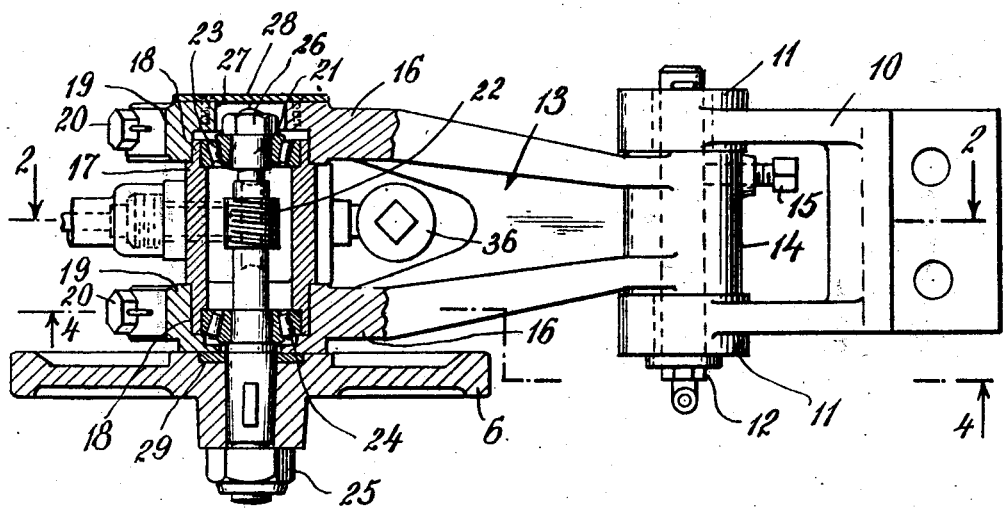
Fig. 3,
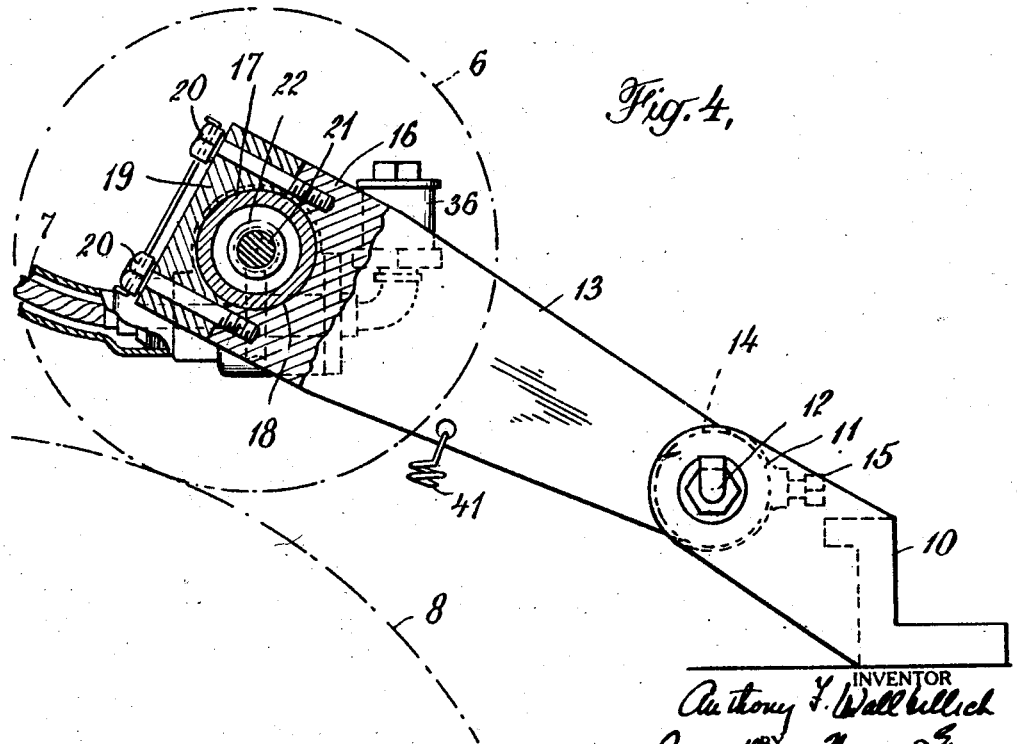
Fig. 4,
INVENTOR
Anthony F. Wallbillich
BY
HIS ATTORNEYS Patented July 5, 1927.

1,634,565

UNITED STATES PATENT OFFICE.

ANTHONY F. WALLBILLICH, OF NEWARK, NEW JERSEY, ASSIGNOR TO DISTANCE-SPEED RECORDING COMPANY, A CORPORATION OF DELAWARE.

DRIVE FOR SPEED-RESPONSIVE INSTRUMENTS.

Application filed August 19, 1924. Serial No. 733,013.

This invention relates to a drive mechanism for measuring instruments, and, more particularly instruments which measure the speed of a moving vehicle or the distance traversed by it. Among such instruments are speed indicators, speed recorders, odometers and others of a like character.

Instruments of the type above referred to, used for ascertaining data as to the movement of a vehicle include moving mechanism which is driven by some part of the vehicle and thus in accordance with the vehicle movement. In speed responsive instruments, which term includes indicating and recording devices, a governor device is frequently employed, driven at a speed corresponding to the speed of rotation of some part of the vehicle which rotates at a rate depending on the surface speed of the vehicle. Heretofore it has been customary to make use of the angular movement of some such part as the source of power for driving the governor which accordingly assumes different positions as the vehicle speed varies. The positions assumed by the governor in turn control the movement of a pointer. In another type of instrument, the governor is dispensed with and an oil pump pumps oil through the instrument at a rate which varies with the vehicle speed. Appropriate devices then measure the rate of flow and as in the case of the governor type, actuate mechanism by which an indicating needle is made to give a speed reading on a scale, or a recording pen made to produce a record on a tape.

In both types of instrument, however, and in similar instruments for measuring distance traversed and the like, the mechanism of the instrument has been driven by various devices, none of which has been altogether satisfactory for the purpose. For instance, in speed indicators and recorders, as used on locomotives, the instrument itself is placed in the locomotive cab and in some cases a driving pulley is mounted on the axle of the trailer truck and the rotation of this pulley is transmitted to the instrument by means of a cord belt drive. In other installations, instead of using a pulley so mounted, the reciprocating movement of one of the cranks is employed, and suitable linkage is provided for transmitting this movement to the mechanism. Both of these drives depend on the angular movement of a driving member, and inaccuracies are introduced in the reading of speed given by the instrument, because as the trailer wheel, or the driving wheels of the locomotive, wear, it follows that the distance traversed in one revolution of these wheels will vary. Consequently, as the wheels wear in use, with the consequent reduction in diameter, the instrument will indicate a higher speed than that at which the locomotive is actually moving. Also, these driving devices, as a rule, are not sufficiently rugged to stand the wear and tear of ordinary use, and in the case of the cord belt drive any slippage of the belt will result in errors in the speed reading.

The object of the present invention is to provide a drive for speed-responsive instruments of the type above refered to, in which errors due to wear will be wholly eliminated, or else reduced to a neglible quantity, and also to provide a drive for such instruments which shall be sufficiently rugged to withstand the rough usage to which such mechanism would ordinarily be subjected in railroad use. In order to eliminate the errors introduced by the wearing of the wheels of the vehicle, and to cause the instrument to be driven by means which depend on the surface speed of the vehicle, rather than on the angular speed of one of its moving parts, the present invention includes the provision of a driving wheel for the speed measuring instrument which rests on the tread of one of the wheels supporting the vehicle. This driving wheel is rotated by its contact with the vehicle wheel, and its rotation is transmitted to the speed measuring instrument through suitable connections, preferably a flexible shaft which gives a positive driving connection. Since the driving wheel lies directly in contact with the tread surface of one of the vehicle wheels, its rotation will be in direct correspondence with the surface speed of the vehicle, and it will always rotate the same number of turns for a given movement of the vehicle, regardless of the wear of the vehicle wheel. Consequently, so long as the driving wheel itself does not wear, the measuring instrument will be so driven that no errors can be introduced, and since the driving wheel makes a rolling contact with the surface on which it bears, wear is greatly eliminated, and, in fact, may be reduced to a point at which the error introduced by this wear is so inconsiderable as to be of no importance.

In addition to the provision of a driving wheel bearing directly on the tread of a wheel of the vehicle, the invention contemplates the provision of suitable devices driven by this wheel and in turn communicating its rotation to the driving connection to the instrument, which are adjustable so that the connections may be led from the driving wheel in any direction which may be convenient, so that if it is desired to make use of a flexible shaft for the driving connection, the shaft may be led to the instrument without the necessity of making sharp bends in it. The improved mechanism for driving the speed-responsive instrument lends itself particularly to use in connection with locomotives where the driving wheel of the mechanism makes contact with the tread of one of the main driving wheels of the locomotive. As these main driving wheels of the locomotive are placed closely together, by mounting the device so that the driving wheel for the speed-responsive instrument lies between the locomotive wheels the device is in a protected position and is not likely to be injured in service.

In the accompanying drawings, I have illustrated one embodiment of the invention in the form which is now preferred, and in Fig. 1 there is shown a side view of a portion of a locomotive, largely in diagrammatic form, showing the speed measuring instrument and its drive in one convenient location on the locomotive, Fig. 2 is a longitudinal cross section of the driving device taken on the line 2—2 of Fig. 3, Fig. 3 is a top plan view of the device, as shown in Fig. 2, with certain of the parts shown in cross section, Fig. 4 is a longitudinal sectional view taken on the line 4—4 of Fig. 3.

Referring now to the drawings, there is shown in Figure 2, largely in diagrammatic form, the installation of a speed indicator or recorder as frequently used on locomotives. The instrument designated as 5 is mounted in any convenient location in the cab and in illustration the drive wheel 6 is suitably supported on a part of the locomotive frame in contact with the tread of one of the locomotive driving wheels. It is preferable to mount the mechanism so that the drive wheel 6 engages the tread of one of the locomotive wheels at a point above a horizontal plane passing through the axle of the latter and also below the top of the driving wheel. Thus the wheel 6 and the parts by which it is supported lie between the treads of the two closely adjacent wheels, as illustrated and are in a protected position. The flexible shaft 7 transmits the motion of the driving wheel to the instrument in the usual manner. While the instrument driving wheel 6 has been shown resting on the tread of a driving wheel 8, it would of course be possible to mount it so that it would lie in contact with the tread of the trailer wheel 9. It may be said in general that the driving wheel for the instrument will be placed so that the distance between its mounting and the instrument will be comparatively short and it is preferable to mount the driving wheel so that the connection between it and the instrument will not involve any considerable changes in direction in the driving connection. This is, of course, particularly important in cases where a flexible shaft is used.

The details of the instrument mechanism need not be described in this connection, since it is possible to make use of many different instruments for the purpose. One type of instrument is shown in U. S. Patent No. 1,468,426 issued to me on September 18, 1923. On reference to that patent it will be seen that the mechanism within the instrument casing is driven by means of a main shaft which is, in turn, driven through a flexible shaft by a driving wheel which receives its motion from one of the vehicle wheels. By making use of the driving wheel which rests on the tread of the vehicle wheel, the speed responsive instrument is driven in correspondence with the surface speed of the vehicle and the angular speed of a moving part of the vehicle is not relied on as has heretofore been customary. As previously explained, when the drive depends on the angular motion of a part of the vehicle then the wearing of this part will introduce errors in the speed and distance reading of the instrument, but in the present type of drive the effect is the same as if the driving wheel 6 were lying in contact with the ground and the rate of rotation of this driving wheel will depend altogether on the speed at which the vehicle moves over the ground. Any wear in the locomotive driving wheel 8 cannot affect the reading of the instrument and the only error that can be introduced will develop from wear of the wheel 6 or else from slippage of this wheel 6 on the locomotive wheel 8. As will presently be described, these errors may be readily kept at a minimum.

The means by which the driving wheel 6 is supported and held in contact with the tread of the wheel 8, is shown in the remaining figures of the drawings. This supporting means includes a bracket 10 which is bolted or otherwise secured to a stationary part of the locomotive such as the frame of the latter. Preferably the bracket 10 is secured to the frame in such position that the drive wheel 6 lies between the treads of the closely adjacent driving wheels of the locomotive. At one end the bracket is forked and across the arms 11, so provided, extends a pivot pin 12. The wheel 6 is carried in the end of an arm 13 the other end of which terminates in a boss 14 through which the pin 12 extends. The arm 13 is secured to the pin 12 by means of a setscrew 15, and as the pin 12 is free to move in the forked end of the bracket 10, the arm 13 can swing about the pin as an axis.

At its forward end the arm 13 terminates in spaced arms 16 and a gear housing 17 which is generally cylindrical in form is supported at its ends in the arms 16. As shown more clearly in Figure 4, the arms 16 have central semi-circular recesses 18 to receive the housing 17 and a cap member 19 held in place by bolts 20 which enter the ends of the arms 16 serves to hold each end of the housing 17 in place with reference to the arms 16. These cap members may be loosened so as to permit the housing 17 to be placed in any angular position relative to the main arm 13. When placed in the proper position of adjustment the bolts 20 may be drawn tight and the housing will then be held in adjusted position against movement. Within the housing is a shaft 21 provided with a worm 22 intermediate its ends, the worm lying substantially at the central point of the housing 17. The shaft 21 is supported within a housing by means of roller bearings 23 and 24 of appropriate design and one end of the shaft extends beyond the housing and carries the drive wheel 6 which is suitably keyed to the shaft. The drive wheel 6 is held in position on the shaft by means of a nut 25 and the shaft 21 carries a nut 26 at its other end so that the shaft may be secured against axial movement relative to the housing. In order to permit its removal, the housing is cut away at one end, as at 27, and this open end of the housing is covered by a plate 28 which is secured in position by screws. The inner face of the wheel 6 is recessed, as at 29, to receive a felt washer which prevents the escape of lubricant from the housing.

Referring now to Figure 2, it will be seen that the housing has an off-set boss 30, along one side, and mounted in this boss in any appropriate manner is a shaft 31 which carries a worm wheel 32 meshing with the worm 22. The shaft 31 is supported in the boss within a sleeve 33 the end of which terminate beyond the face of the boss in a threaded enlargement 34. At the other end of the hollow shaft is an oil passage 35 communicating with the interior of the casing and an oil cup 36 is mounted in the boss in such position as to deliver its contents to the interior of the casing through the passage. The shaft 31 has a recess 37 at its forward end and in this recess is a locking plate 38. The end link 39 of a round flexible shaft has a flattened portion 40 so formed that the link 39 may be received in the recess 37 in the shaft 31, and by engagement of the plate 38 with the link, the flexible shaft will be rotated as the shaft 31 rotates. The arm 13 is swung on its pivot so as to hold the driving wheel 6 in contact with the tread of the locomotive wheel 8 by means of a spring 41, one end of which is secured to the arm near its end, while the other end of the spring is secured to some fixed part of the locomotive.

By mounting the driving wheel on a fixed support which is capable of being swung so that the wheel may accommodate itself to the movements of the locomotive wheel with reference to the frame, any slippage between the driving wheel and the locomotive wheel has been largely eliminated, at least the error introduced from this source is so small as to be of no importance. In addition to the elimination of this error, any error which might be introduced by the wearing of the driving wheel 6 may be eliminated by making that wheel with a hard tread. For instance, it will be noted that the wheel is in the form of a circular web having an enlarged tread surface. The web is preferably made of soft steel and the tread of some alloy steel, such as a vanadium steel. This tread will not wear to any considerable extent under any conditions because of the fact that it has a rolling contact with the tread of the locomotive wheel 8, but by making its rim of some material such as that referred to, its circumference will remain substantially constant for long periods of time. Also, this driving wheel 6 is quite inexpensive and it may be cheaply and readily replaced whenever conditions require.

The present drive mechanism also affords numerous advantages, among which may be mentioned the fact that the readings of the speed indicating or recording instrument may be quickly converted from miles to kilometers and vice-versa, without any alterations in the mechanism itself For this purpose it is only necessary to substitute a suitable driving wheel 6, the worm and worm wheel for which have been selected to produce the desired result. Such an alteration in the use of the instrument consequently does not require any alterations in its mechanism, but simply necessitates the substitution of certain parts in the drive mechanism.

As previously explained, it is customary and desirable to use a flexible shaft connection between the instrument in the cab and the driving wheel 6. Such flexible shaft should always be led from the driving wheel to the instrument with as few bends as possible and these bends should also be made with as large a radius as possible. The present drive mechanism makes it possible to arrive at the desired condition with great ease because after the bracket 10 has been secured in place, and the driving wheel 6 put in contact with the tread of the vehicle on which it is to run, then the housing 17 can be adjusted in any position which is required so that the end of the drive shaft 31 will point in any desired direction. Thus, this adjustment permits the adjustable shaft to be led directly to the instrument with few bends and these bends may be made on as large a radius as may be desirable. While I have described the new driving mechanism in connection with a speed indicator and recorder, it will be understood that it is appropriate for use in connection with many other instruments, as for instance, those which measure or record distance traversed. Also its use is by no means limited to locomotives, but it has been designed purposely so as to be sufficiently strong and rugged for railroad use, and it will be seen from a consideration of the drawings and the description that the drive mechanism is comparatively simple and cheap to construct, and there are no parts which would wear quickly. Furthermore, it does not require any considerable adjustment or attention in use and will operate satisfactorily for indefinite periods.

By mounting the device in the manner shown, the bracket may be secured to a portion of the frame of the locomotive, and the arm pivotally secured to the bracket extends into the space between the two adjacent drive wheels of the locomotive. The wheel 6 thus bears against the tread of one of these drive wheels at a point beyond the top of the drive wheel and above a horizontal plane through the axle. The mechanism is thus in protected position.

I claim:

A device for driving an instrument for indicating the speed of a moving vehicle, comprising the combination of a support secured to a fixed part of the vehicle, an arm pivotally mounted on the support, this arm terminating in forked ends, a housing carried by the support, a shaft rotatably mounted in the housing, a wheel carried by the shaft beyond the housing and adapted to lie in contact with the tread of one of the vehicle wheels to be rotated thereby as the vehicle moves, a secondary shaft within the housing driven by the first shaft and connected to the speed-responsive mechanism, and a device for lubricating the secondary shaft secured to the housing and lying in the space between the forked ends of the arm in which the housing is mounted.

In testimony whereof I affix my signature.

ANTHONY F. WALLBILLICH.